US010250467B2

(12) United States Patent
Bragstad et al.

(10) Patent No.: US 10,250,467 B2
(45) Date of Patent: *Apr. 2, 2019

(54) ALLOCATING OPERATORS OF A STREAMING APPLICATION TO VIRTUAL MACHINES BASED ON MONITORED PERFORMANCE

(71) Applicant: International Business Machines Corporation, Armonk, NY (US)

(72) Inventors: Lance Bragstad, Pine Island, MN (US); Michael J. Branson, Rochester, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 768 days.

This patent is subject to a terminal disclaimer.

(21) Appl. No.: 14/277,027

(22) Filed: May 13, 2014

(65) Prior Publication Data
US 2015/0256477 A1 Sep. 10, 2015

Related U.S. Application Data

(63) Continuation of application No. 14/200,118, filed on Mar. 7, 2014, now Pat. No. 9,794,139.

(51) Int. Cl.
*G06F 15/173* (2006.01)
*H04L 12/26* (2006.01)
(Continued)

(52) U.S. Cl.
CPC .......... *H04L 43/04* (2013.01); *G06F 9/45558* (2013.01); *G06F 9/50* (2013.01);
(Continued)

(58) Field of Classification Search
USPC .......................................................... 709/226
See application file for complete search history.

(56) References Cited

U.S. PATENT DOCUMENTS 9,794,139 B2 10/2017 Bragstad et al.
2005/0138664 A1 6/2005 Neogi
(Continued)

*Primary Examiner* — Alan S Chou
(74) *Attorney, Agent, or Firm* — Martin & Associates, LLC; Derek P. Martin

(57) ABSTRACT

Performance thresholds are defined for operators in a flow graph for a streaming application. A streams manager deploys the flow graph to one or more virtual machines (VMs). The performance of each portion of the flow graph on each VM is monitored. A VM is selected. When the performance of the portion of the flow graph in the selected VM does not satisfy the defined performance threshold(s), a determination is made regarding whether the portion of the flow graph is underperforming or overperforming. When the portion of the flow graph is underperforming, the portion of the flow graph is split into multiple portions that are implemented on multiple VMs. When the portion of the flow graph is overperforming, a determination is made of whether a neighbor VM is also overperforming. When a neighbor VM is also overperforming, the two VMs may be coalesced into a single VM.

10 Claims, 9 Drawing Sheets

(51) Int. Cl.
*G06F 11/32* (2006.01)
*G06F 9/455* (2018.01)
*G06F 9/50* (2006.01)
*G06F 11/34* (2006.01)
*H04L 12/24* (2006.01)

(52) U.S. Cl.
CPC .......... *G06F 11/32* (2013.01); *G06F 11/3404* (2013.01); *G06F 11/3442* (2013.01); *H04L 41/0896* (2013.01); *H04L 41/5009* (2013.01); *H04L 41/5025* (2013.01); *G06F 11/3409* (2013.01); *G06F 2009/4557* (2013.01); *G06F 2201/81* (2013.01); *G06F 2201/815* (2013.01); *G06F 2201/865* (2013.01); *H04L 41/5096* (2013.01)

(56) References Cited

U.S. PATENT DOCUMENTS

| | | |
|---|---|---|
| 2011/0022812 A1 | 1/2011 | van der Linden et al. |
| 2012/0179809 A1 | 7/2012 | Barsness et al. |
| 2012/0271927 A1 | 10/2012 | Shakirzyanov et al. |
| 2013/0173587 A1* | 7/2013 | Imaki ................ G06F 17/30516 707/713 |
| 2013/0179591 A1 | 7/2013 | Branson et al. |
| 2013/0198489 A1 | 8/2013 | Branson et al. |
| 2013/0297802 A1* | 11/2013 | Laribi .................... H04L 47/80 709/226 |
| 2014/0026133 A1 | 1/2014 | Parker |
| 2014/0324862 A1 | 10/2014 | Bingham et al. |
| 2015/0058842 A1 | 2/2015 | Chen et al. |
| 2015/0127808 A1 | 5/2015 | Bragstad et al. |
| 2015/0142951 A1 | 5/2015 | Bragstad et al. |
| 2015/0143363 A1 | 5/2015 | Gombert et al. |

\* cited by examiner

ALLOCATING OPERATORS OF A STREAMING APPLICATION TO VIRTUAL MACHINES BASED ON MONITORED PERFORMANCE

BACKGROUND

1. Technical Field

This disclosure generally relates to streaming applications, and more specifically relates to monitoring performance of a streaming application and allocating operators to virtual machines based on the monitored performance.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

BRIEF SUMMARY

Performance thresholds are defined for operators in a flow graph for a streaming application. A streams manager deploys the flow graph to one or more virtual machines (VMs). The performance of each portion of the flow graph on each VM is monitored. A VM is selected. When the performance of the portion of the flow graph deployed on the selected VM does not satisfy the defined performance threshold(s), a determination is made regarding whether the portion of the flow graph is underperforming or overperforming. When the portion of the flow graph in the selected VM is underperforming, the portion of the flow graph is split into multiple portions that are implemented on multiple VMs. When the portion of the flow graph in the selected VM is overperforming, a determination is made of whether a neighbor VM is also overperforming. When a neighbor VM is also overperforming, the two VMs may be coalesced into a single VM. In this manner performance of a streaming application may be dynamically adjusted as needed.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

Figure 9:
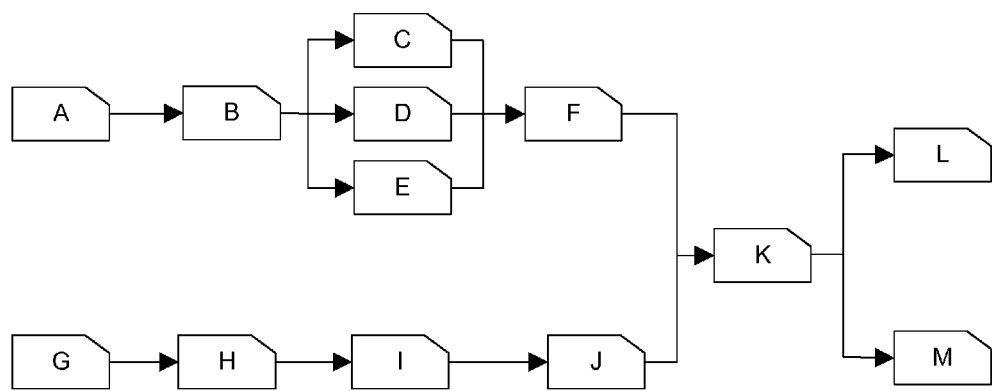
FIG. 9 is a block diagram showing an example of a flow graph of a suitable streaming application.
Figure 11:
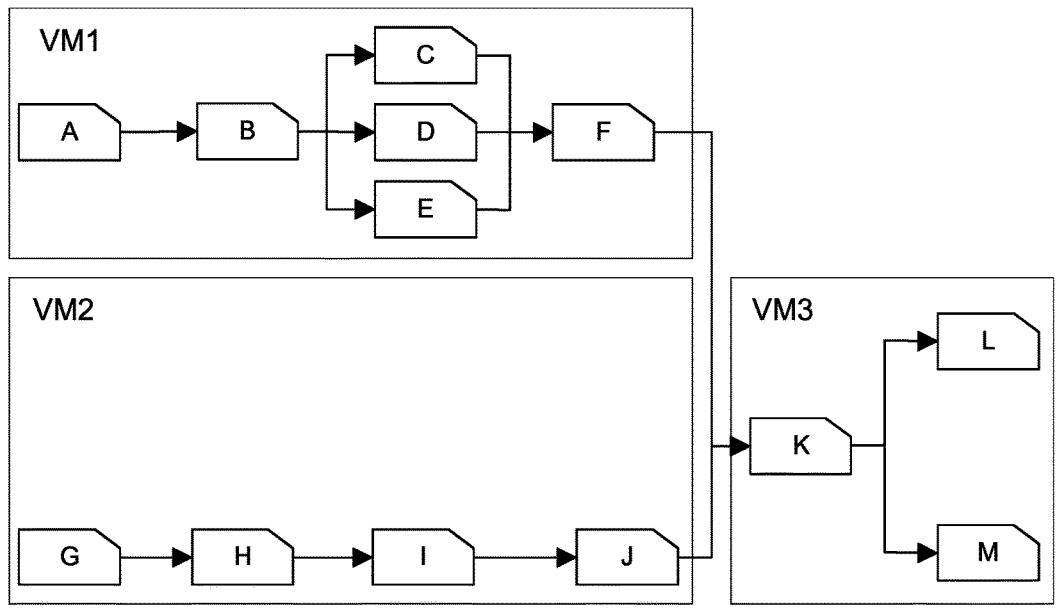
FIG. 11 is a block diagram showing allocation of the flow graph in FIG. 10 to three VMs after splitting the portion of the flow graph that resided in VM2 in FIG. 10 into two portions that are deployed to separate VMs.
Figure 12:
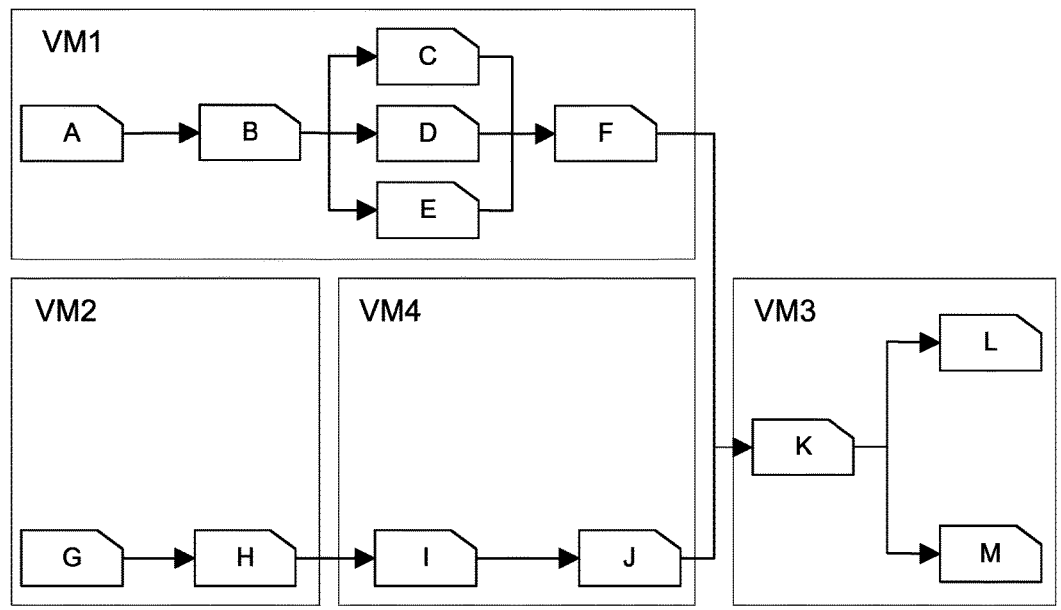
Figure 13:
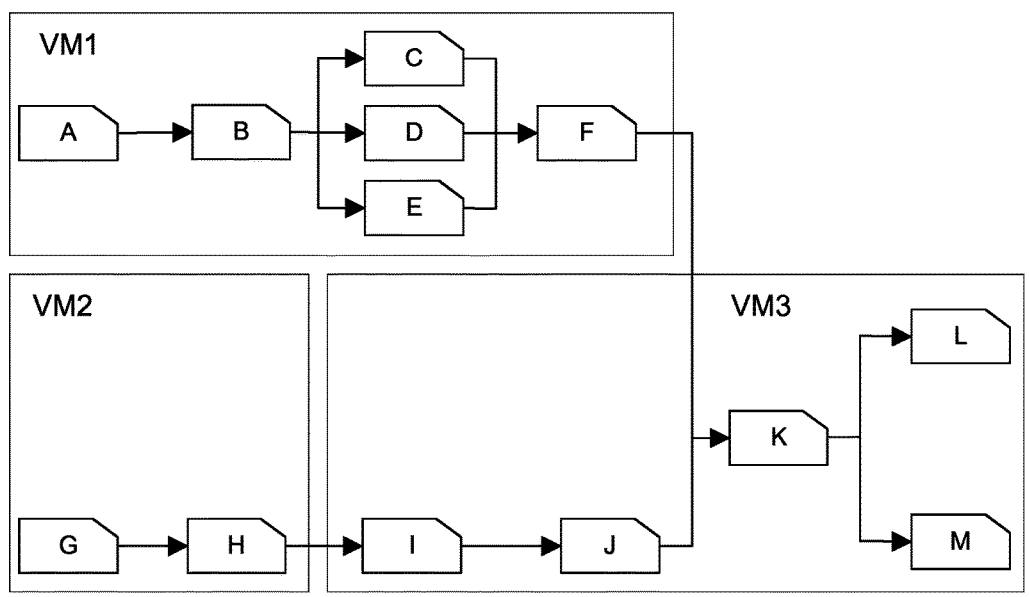

FIG. 12 is a block diagram showing allocation of the flow graph in FIG. 9 to four VMs after splitting the portion of the flow graph that resided in VM2 in FIG. 11 into two portions that are deployed to separate VMs; and FIG. 13 is a block diagram showing allocation of the flow graph in FIG. 12 to three VMs by coalescing the portions of the flow graph that were in VM3 and VM4 in FIG. 12 to a single VM.

DETAILED DESCRIPTION

The disclosure and claims herein relate to a streams manager that deploys a flow graph for a streaming application to one or more virtual machines (VMs). Performance thresholds are defined for operators in the flow graph. The performance of each portion of the flow graph on each VM is monitored. A VM is selected. When the performance of the portion of the flow graph deployed on the selected VM does not satisfy the defined performance threshold(s), a determination is made regarding whether the portion of the flow graph is underperforming or overperforming. When the portion of the flow graph in the selected VM is underperforming, the portion of the flow graph is split into multiple portions that are implemented on multiple VMs. When the portion of the flow graph in the selected VM is overperforming, a determination is made of whether a neighbor VM is also overperforming. When a neighbor VM is also overperforming, the two VMs are coalesced into a single VM. In this manner performance of a streaming application may be dynamically adjusted as needed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
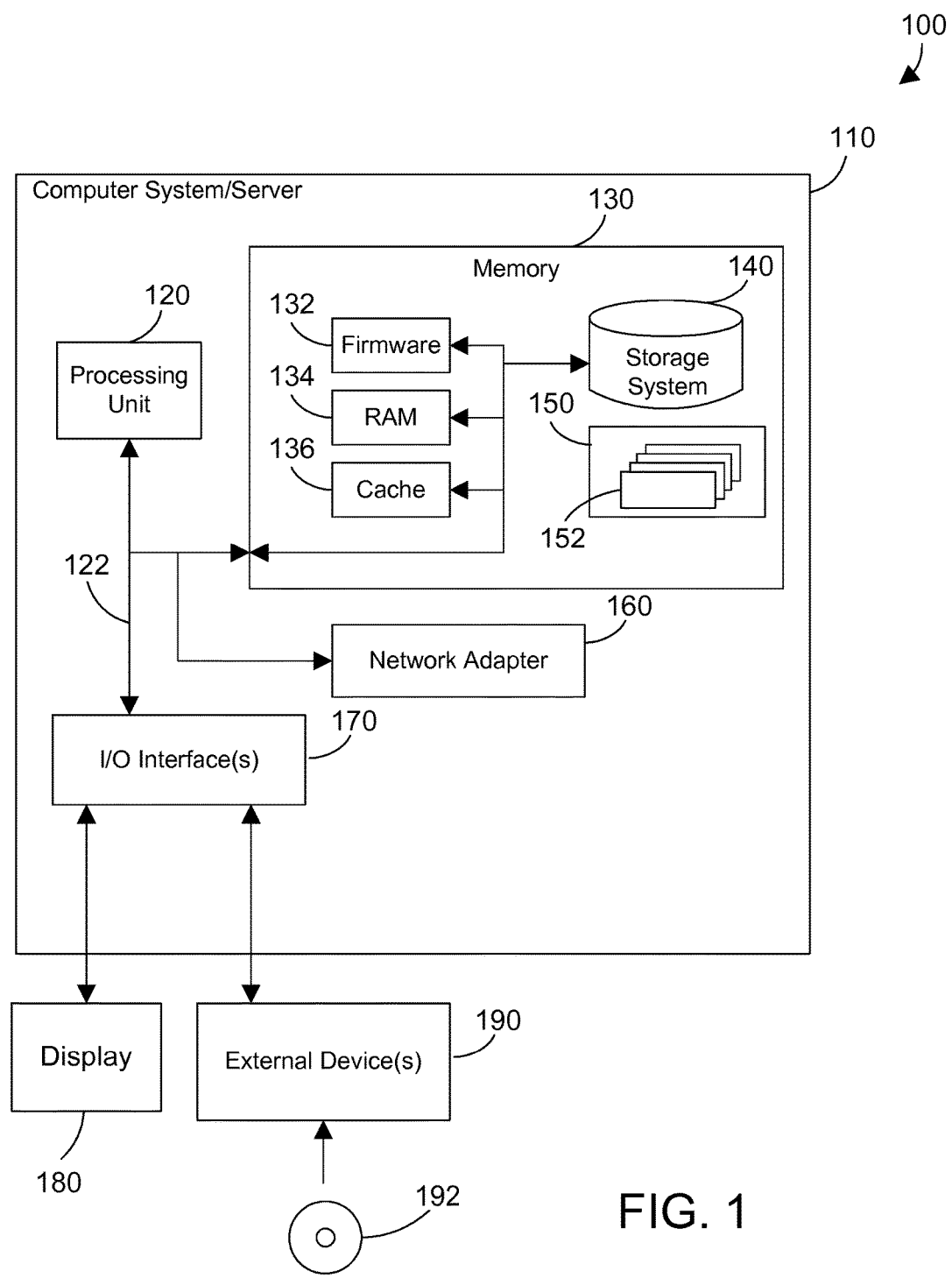
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
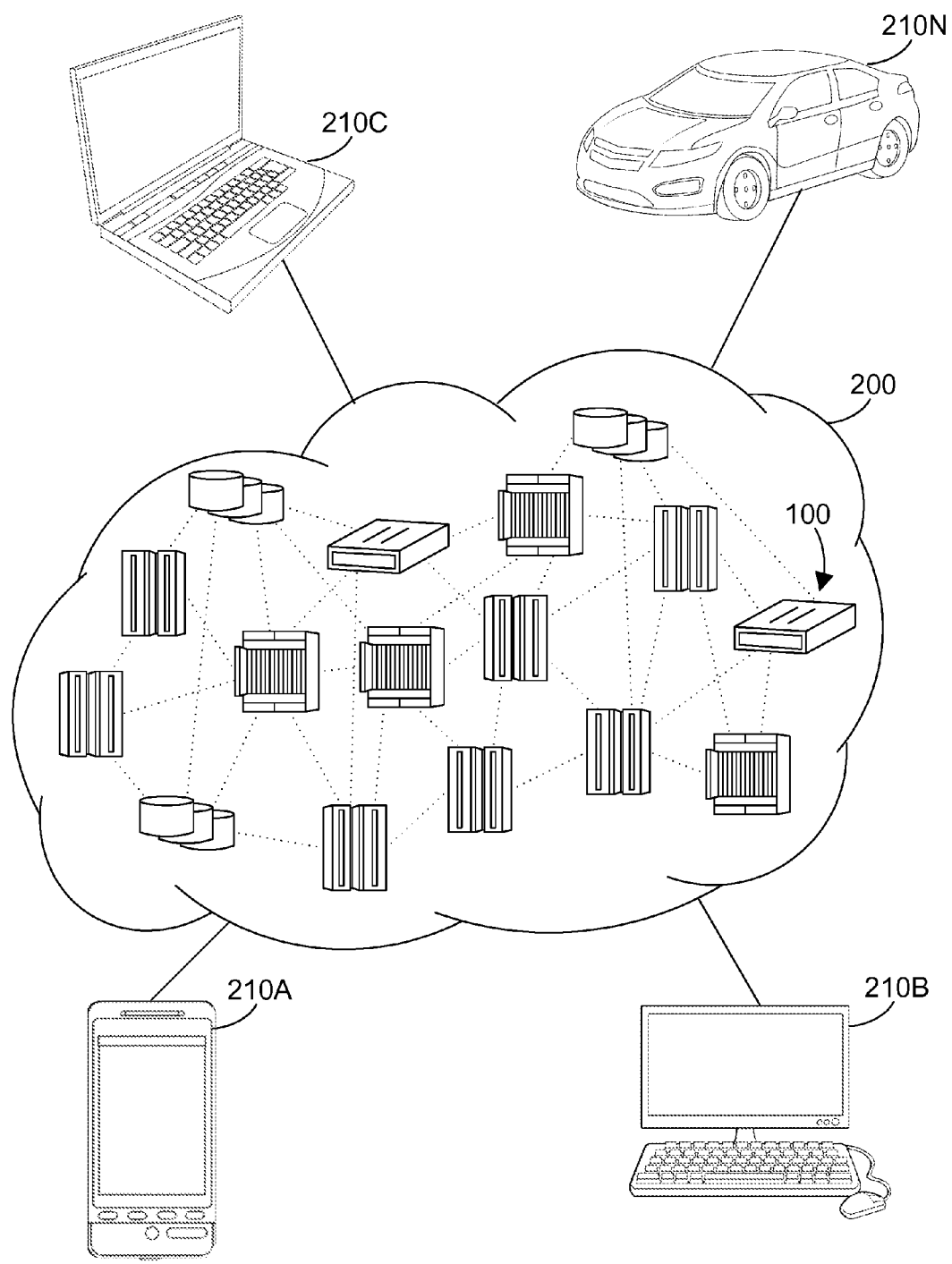
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
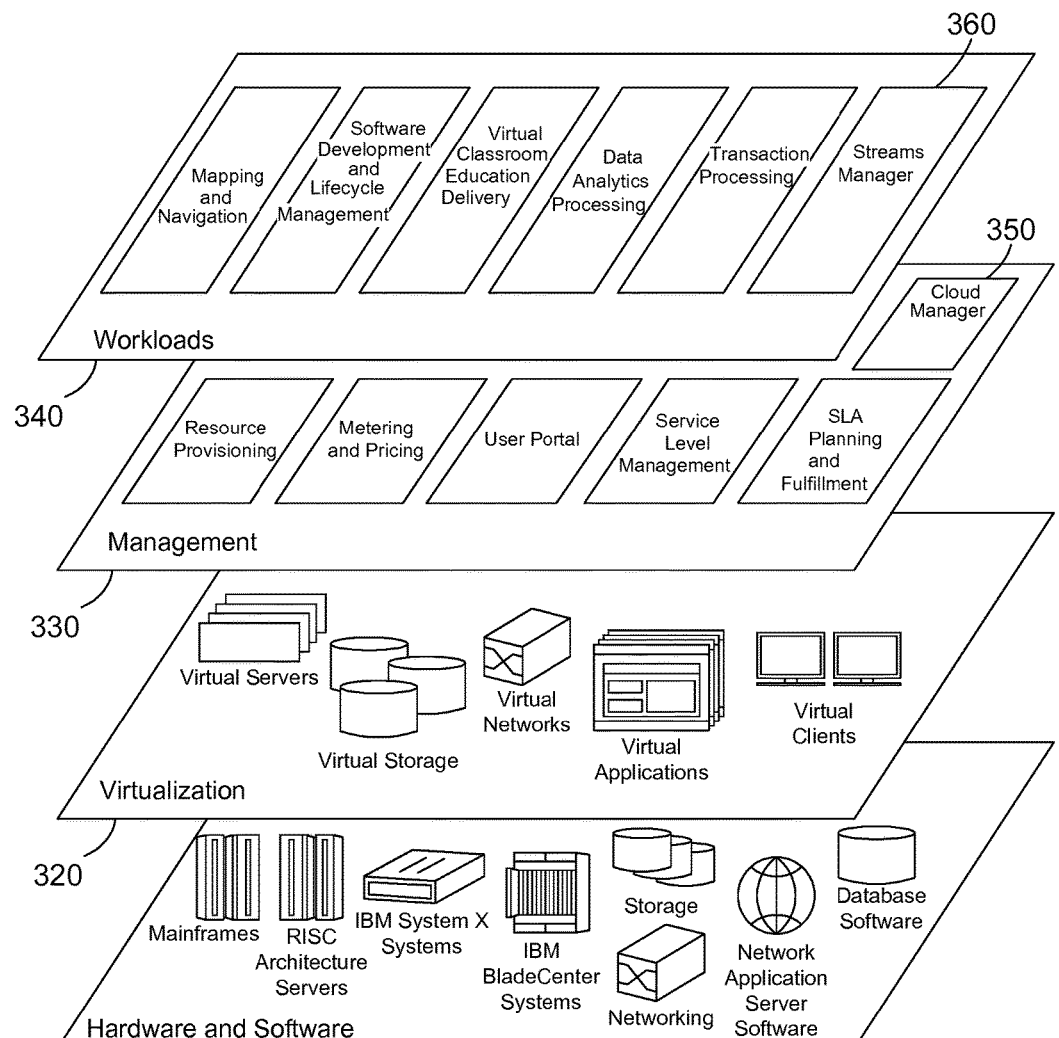
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a streams manager 360, as discussed in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
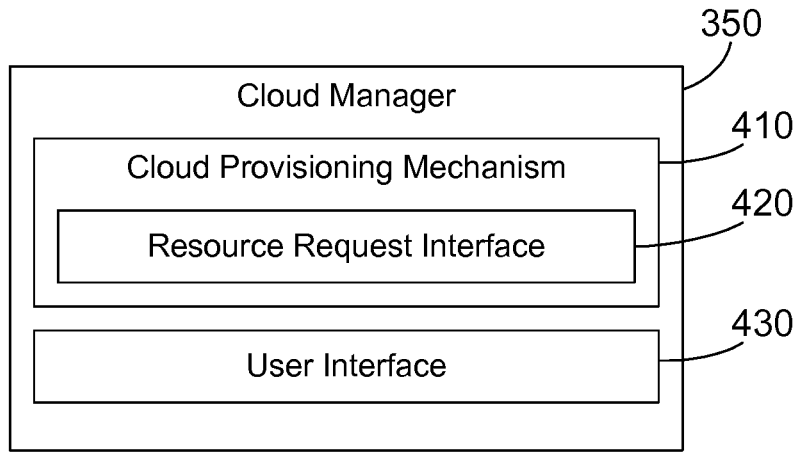
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request virtual machines from the cloud manager 350 without human intervention. The cloud manager 350 also includes a user interface 430 that allows a user to interact with the cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the cloud mechanism 350 without input from a human user. Of course, cloud manager 350 could include many other features and functions known in the art that are not shown in FIG. 4.

Figure 5:
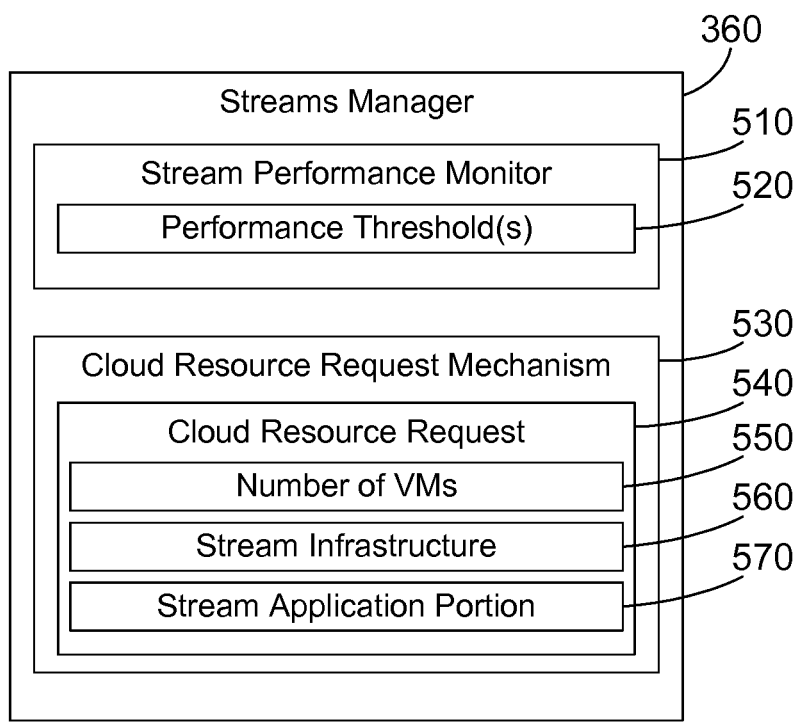
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a performance monitor 510 with one or more performance thresholds 520. Performance thresholds 520 can include static thresholds, such as tuple rates, and can also include any suitable heuristic for measuring performance of a streaming application as a whole or for measuring performance of one or more operators in a streaming application. Performance thresholds 520 may include different thresholds and metrics at the operator level, at the level of a group of operators that make up a portion of the flow graph, and at the level of the overall performance of the streaming application. The stream performance monitor 510 monitors performance of a streaming application, and when current performance compared to the one or more performance thresholds 520 indicates a portion of the streaming application is underperforming or overperforming, the stream performance monitor 510 can take appropriate action, such as splitting an underperforming portion of the flow graph running on a VM into two portions that run on different VMs, or coalescing two portions of the flow graph that are both overperforming and running on two neighboring VMs into a single VM. Note the streams manager 360 communicates the need for resources to the cloud resource request mechanism 530. The cloud resource request mechanism 530, in response to the communication from the stream performance monitor, assembles a cloud resource request 540, which can include information such as a number of VMs to provision 550, stream infrastructure needed in each VM 560, and a stream application portion 570 for each VM. Once the cloud resource request 530 is formulated, the streams manager 360 submits the cloud resource request 540 to a cloud manager, such as cloud manager 350 shown in FIGS. 3 and 4.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 540 in FIG. 5 could specify two VMs at 550, could specify the common stream infrastructure, such as an operating system and middleware, at 560, and could specify operator A and operator B at 570. In response, the cloud manager would provision two VMs with the common stream infrastructure, with the first of the VMs hosting operator A and the second of the VMs hosting operator B. In the alternative, the cloud resource request 540 could be formulated such that each VM is specified with its corresponding stream infrastructure and stream application portion. In this configuration, the cloud resource request would specify a first VM with the common stream infrastructure and operator A, and a second VM with the common stream infrastructure and operator B.

Figure 6:
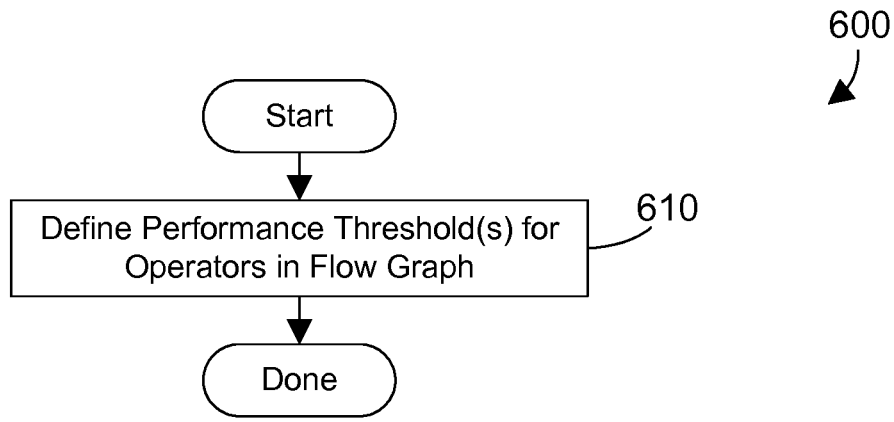
FIG. 6 is a flow diagram of a method for defining one or more performance thresholds for operators in a flow graph of a streaming application.

Referring to FIG. 6, a method 600 defines one or more performance thresholds for operators in the flow graph (step 610). The performance thresholds defined in step 610 are included in the performance thresholds 520 shown in FIG. 5. As explained above, the performance thresholds can include any suitable static threshold or heuristic for determining when a single operator is underperforming and overperforming, for determining when any group of operators in the flow graph is underperforming and overperforming, and for determining when the streaming application as a whole is underperforming or overperforming.

A simple example will illustrate. In one specific implementation, the performance thresholds include a lower threshold of tuple rate for each operator that defines the desired minimum performance of the operator and an upper threshold of tuple rate for each operator that defines the desired maximum performance of the operator. When the operator has a throughput that is less than the lower threshold, the operator is underperforming. When the operator has a throughput that is more than the upper threshold, the operator is overperforming. Similar principles could be applied to groups of operators, and to the streaming application as a whole. As used herein, the term "underperforming" means some portion of the flow graph (e.g., a single operator, multiple operators, or the entire flow graph) has performance that needs to be increased, while "overperforming" means the portion of the flow graph has more performance than it needs.

Figure 7:
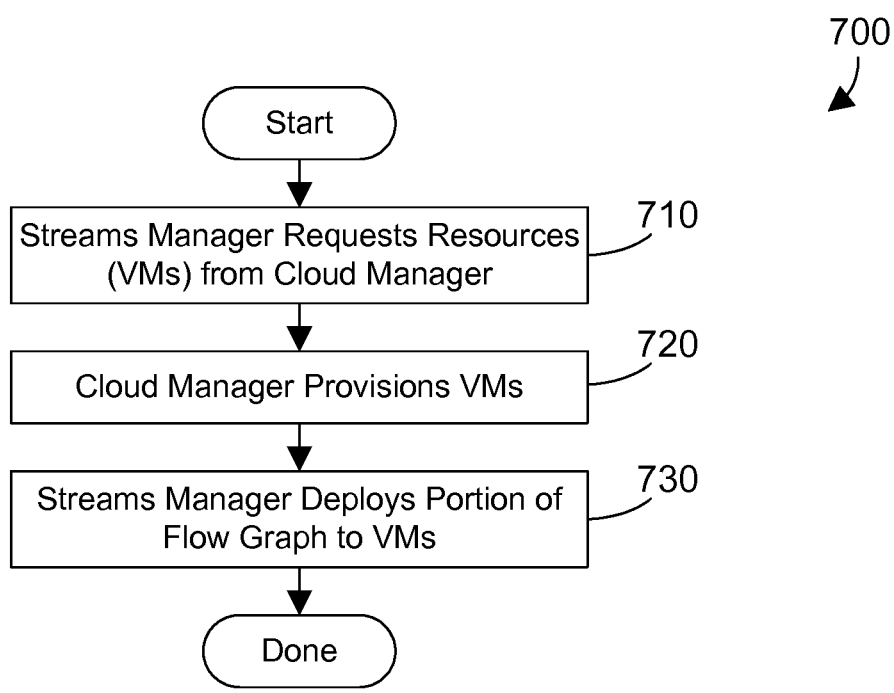
FIG. 7 is a flow diagram of a method for a streams manager to interact with a cloud manager to deploy a portion of a flow graph to one or more VMs.

FIG. 7 shows a method 700 for the streams manager to deploy portions of a streaming application to one or more VMs. The streams manager requests resources, such as VMs, from the cloud manager (step 710). The cloud manager provisions the VMs (step 720). The streams manager then deploys a portion of the flow graph to the VMs (step 730). In the most preferred implementation, when the streams manager deploys a portion of a flow graph to a VM, it does so using method 700.

Figure 8:
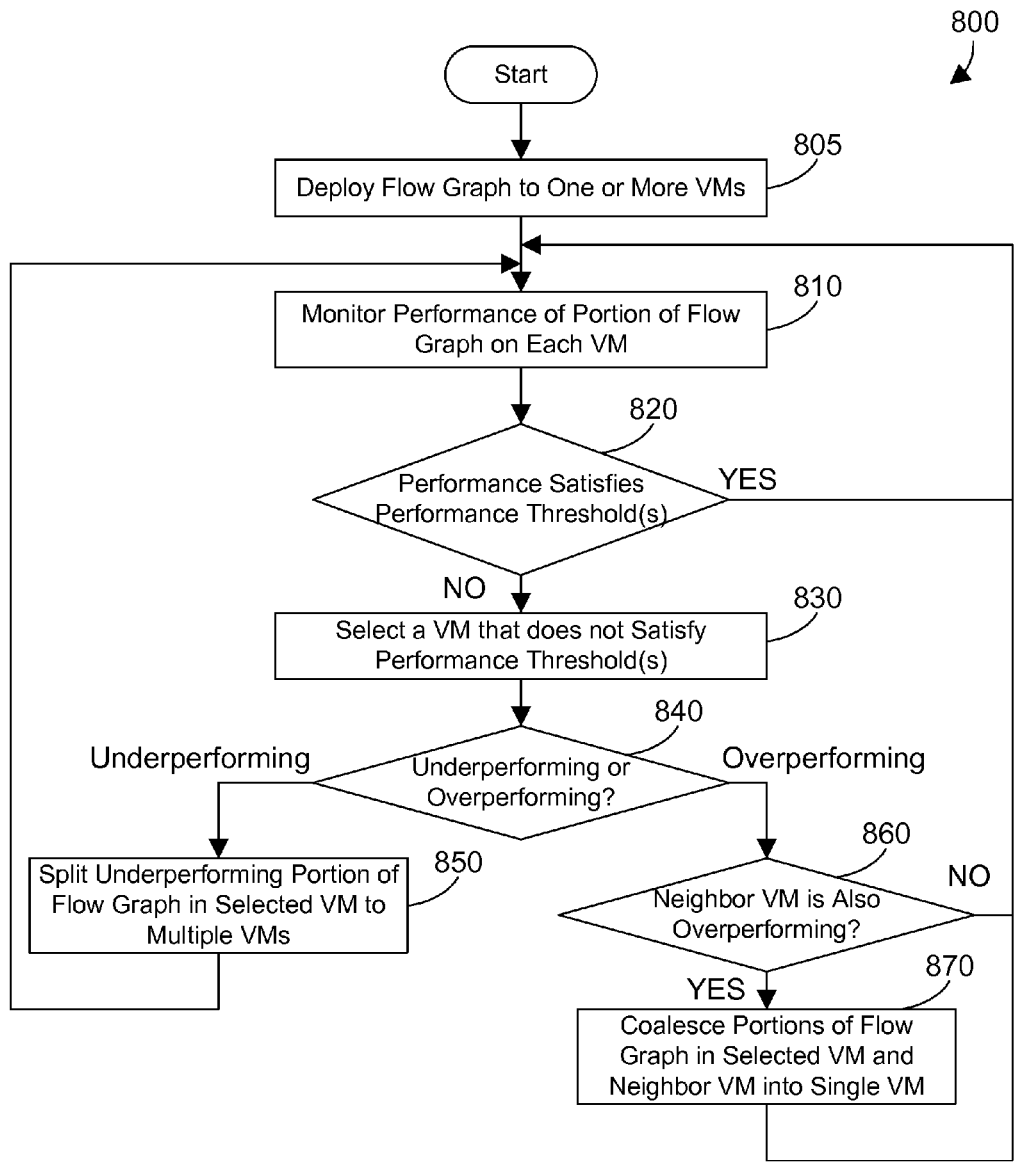
FIG. 8 is a flow diagram of a method for a streams manager to monitor performance of each portion of a flow graph deployed on different VMs, and to dynamically adjust the allocation of VMs to the streaming application.

FIG. 8 shows one suitable example of a method 800 for running a streaming application. The streams manager deploys the flow graph to one or more VMs (step 805). Step 805 is one suitable implementation for step 730 in FIG. 7. In one suitable implementation, the flow graph is initially deployed to a single VM. However, in an alternative implementation, the flow graph can be deployed to multiple VMs. The flow graph could be divided into different portions in any suitable way and using any suitable heuristic for initially deploying the flow graph to multiple VMs. The performance of the portion of the flow graph in each VM is monitored (step 810). When the performance satisfies the performance thresholds (step 820=YES), no corrective action is needed, so method 800 returns to step 810. When the performance of one or more portions of the streaming application does not satisfy one or more of the performance thresholds (step 820=NO), a VM that includes a portion that does not satisfy the performance threshold(s) is selected (step 830). A determination is then made regarding whether the portion of the flow graph that does not satisfy the performance threshold(s) is underperforming or overperforming (step 840). When the portion of the flow graph is underperforming (step 840=Underperforming), the underperforming portion of the flow graph is split to run on multiple VMs (step 850). This split can be made in any suitable way using any suitable heuristic. For example, the split can be made horizontally or vertically using any suitable criteria for performing the split. The heuristic could a single heuristic, or there could be multiple heuristics, one of which could be selected according to the results of the performance monitoring in step 810.

When the portion of the flow graph in the selected VM is overperforming (step 840=Overperforming), method 800 determines whether a neighbor VM is also overperforming (step 860). As used herein, a neighbor VM is a VM that includes an operator that communicates with an operator in the selected VM. When the selected VM has a neighbor VM that is also overperforming (step 860=YES), the portion of the flow graph in the selected VM and the portion of the flow graph in the neighbor VM can be coalesced into a single VM (step 870). Note the single VM in step 870 could be the selected VM, the neighbor VM, or a different VM.

Note that method 800 loops to continuously monitor performance of all portions of the flow graph, and dynamically changes allocation of portions of the flow graph that are underperforming by splitting at least one portion of the flow graph to different VMs (step 850) and changes allocation of portions of the flow graph that are overperforming by coalescing at least one portion of the flow graph to a single VM (step 870).

Figure 10:
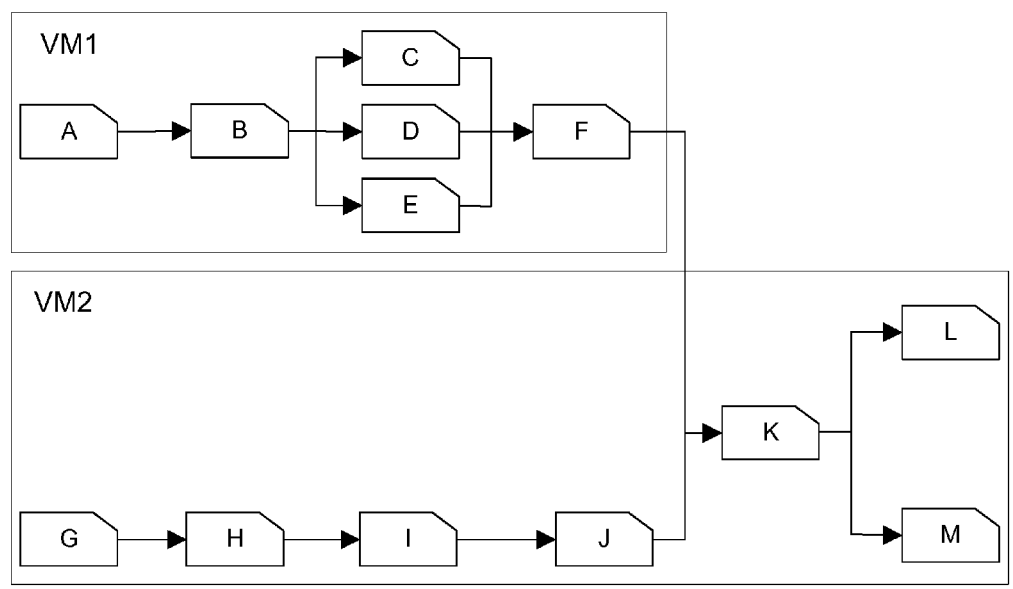
FIG. 10 is a block diagram showing allocation of the flow graph in FIG. 9 to two VMs after splitting the flow graph into two portions.

Examples are now presented to illustrate the concepts discussed above with respect to FIGS. 6-8. One example of a flow graph is shown in FIG. 9 that includes operators labeled A through M. We assume for this example the flow graph in FIG. 9 is initially deployed to a single VM such that the entire streaming application in FIG. 9 resides on a single VM. We assume the streaming application in FIG. 9 is underperforming, which means the streaming application in FIG. 9 does not satisfy one or more of the performance thresholds (step 820=NO). The single VM that contains the entire streaming application shown in FIG. 9 is selected (step 830). Because the streaming application is underperforming (step 840=Underperforming), the streaming application is split into multiple VMs, as shown in FIG. 10. As discussed above, the split can be made using any suitable criteria or heuristic. We assume the split in FIG. 10 results in the portion of the flow diagram in VM1 satisfying the performance thresholds, but the portion of the flow diagram in VM2 is still underperforming. The portion in VM2 is thus split again between VM2 and VM3, as shown in FIG. 11. We assume the split in FIG. 11 results in the portions of the flow diagram in VM1 and VM3 satisfying the performance thresholds, but the portion of the flow diagram in VM2 is still underperforming. The portion in VM2 is thus split again between VM2 and VM4, as shown in FIG. 12. We assume at this point that all portions in all four VMs in FIG. 12 satisfy the performance thresholds.

Let's assume the splitting done in FIGS. 10, 11 and 12 was necessary due to a heavy load on the streaming application. Let's further assume the heavy load is reduced to a more reasonable load, which results in VM3 and VM4 both overperforming (step 840=Overperforming). Because these are neighbor nodes by having operators connected to each other, and because both are overperforming, the portions of the flow graph implemented in VM3 and VM4 can be coalesced into a single VM, as shown at VM3 in FIG. 13. This simple example shows how a streams manager can dynamically split portions of a flow graph and can dynamically coalesce portions of a flow graph as needed to satisfy the defined performance thresholds. Because the splitting and coalescing is done on a dynamic and ongoing basis, the deployment of the flow graph to VMs can change as needed to address performance issues.

The figures and description above support an apparatus comprising: at least one processor; a memory coupled to the at least one processor; a streaming application residing in the memory and executed by the at least one processor, the streaming application comprising a flow graph that includes a plurality of operators that process a plurality of data tuples; a plurality of performance thresholds residing in the memory for the plurality of operators in the flow graph; and a streams manager residing in the memory and executed by the at least one processor, the streams manager deploying the flow graph on at least one virtual machine (VM), monitoring performance of the streaming application, and when performance of a first portion of the streaming application in a selected VM does not satisfy at least one of the plurality of performance thresholds, the streams manager determines when the first portion of the streaming application in the selected VM is underperforming, and when the first portion of the streaming application in the selected VM is underperforming, the first portion of the streaming application in the selected VM is split into second and third portions of the streaming application that are deployed to a plurality of VMs.

The figures and description above additionally support a computer-implemented method executed by at least one processor for running a streaming application, the method comprising: deploying a streaming application that comprises a flow graph that includes a plurality of operators that process a plurality of data tuples on at least one virtual machine (VM); defining a plurality of performance thresholds for the plurality of operators in the flow graph; monitoring performance of the streaming application; when performance of a first portion of the streaming application in a selected VM does not satisfy at least one of the plurality of performance thresholds, determining when the first portion of the streaming application in the selected VM is underperforming, and when the first portion of the streaming application in the selected VM is underperforming, splitting the first portion of the streaming application in the selected VM into second and third portions of the streaming application that are deployed to a plurality of VMs.

The figures and description above further support a computer-implemented method executed by at least one processor for running a streaming application, the method comprising: deploying a streaming application that comprises a flow graph that includes a plurality of operators that process a plurality of data tuples on a single virtual machine (VM) by requesting a cloud manager provision the single VM, and after the cloud manager provisions the single VM, the streams manager deploys the flow graph to the single VM; defining a plurality of performance thresholds for the plurality of operators in the flow graph, wherein the plurality of performance thresholds includes at least one threshold that indicates when at least one operator in the flow graph is underperforming and at least one threshold that indicates when at least one operator in the flow graph is overperforming; monitoring performance of the streaming application; when performance of the streaming application in the single VM does not satisfy at least one of the plurality of performance thresholds, determining when the streaming application in the single VM is underperforming, and when the streaming application in the single VM is underperforming, splitting the streaming application in the single VM into first and second portions of the streaming application that are deployed to first and second VMs by requesting the cloud manager provision the first and second VMs; when performance of the first portion of the streaming application in the first VM does not satisfy at least one of the plurality of performance thresholds, determining when the first portion of the streaming application in the first VM is underperforming, and when the first portion of the streaming application in the first VM is underperforming, splitting the first portion of the streaming application in the first VM into third and fourth portions of the streaming application that are deployed to respective third and fourth VMs by requesting the cloud manager provision the third and fourth VMs; when performance of the second portion of the streaming application in the second VM does not satisfy at least one of the plurality of performance thresholds, determining when the second portion of the streaming application in the second VM is underperforming, and when the second portion of the streaming application in the second VM is underperforming, splitting the second portion of the streaming application in the second VM into fifth and sixth portions of the streaming application that are deployed to respective fifth and sixth VMs; when performance of the first portion of the streaming application in the first VM does not satisfy the at least one of the plurality of performance thresholds, determining when the first portion of the streaming application in the first VM is overperforming, and when the first portion of the streaming application in the first VM is overperforming and when a different VM that has an operator in a seventh portion of the flow graph that communicates with an operator in the first portion of the streaming application in the selected VM is also overperforming, coalescing the first portion and the seventh portion to run on a single VM; and continuously monitoring performance of all portions of the flow graph and dynamically changing allocation of portions of the flow graph that are underperforming by splitting at least one portion of the flow graph to different VMs and changing allocation of portions of the flow graph that are overperforming by coalescing at least one portion of the flow graph to a single VM.

The disclosure and claims herein relate to a streams manager that deploys a flow graph for a streaming application to one or more virtual machines (VMs). Performance thresholds are defined for operators in the flow graph. The performance of each portion of the flow graph on each VM is monitored. A VM is selected. When the performance of the portion of the flow graph deployed on the selected VM does not satisfy the defined performance threshold(s), a determination is made regarding whether the portion of the flow graph is underperforming or overperforming. When the portion of the flow graph in the selected VM is underperforming, the portion of the flow graph is split into multiple portions that are implemented on multiple VMs. When the portion of the flow graph in the selected VM is overperforming, a determination is made of whether a neighbor VM is also overperforming. When a neighbor VM is also overperforming, the two VMs are coalesced into a single VM. In this manner performance of a streaming application may be dynamically adjusted as needed.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a streaming application residing in the memory and executed by the at least one processor, the streaming application comprising a flow graph that includes a plurality of operators that process a plurality of data tuples;
   a plurality of performance thresholds residing in the memory for the plurality of operators in the flow graph that define when at least a portion of the flow graph is underperforming and overperforming; and
   a streams manager residing in the memory and executed by the at least one processor, the streams manager deploying the flow graph on at least one virtual machine (VM), monitoring performance of the streaming application, and when performance of a first portion of the streaming application in a selected VM does not satisfy at least one of the plurality of performance thresholds, thereby indicating the first portion of the streaming application in the selected VM is underperforming, the streams manager splits the first portion of the streaming application in the selected VM into second and third portions of the streaming application that are deployed to a plurality of VMs, wherein the streams manager continuously monitors performance of all portions of the flow graph and dynamically changes allocation of portions of the flow graph that are underperforming by splitting at least one portion of the flow graph to different VMs and changes allocation of portions of the flow graph that are overperforming by coalescing at least one portion of the flow graph to a single VM.

2. The apparatus of claim 1 wherein when performance of the first portion of the streaming application in the selected VM does not satisfy the at least one of the plurality of performance thresholds, thereby indicating the first portion of the streaming application in the selected VM is overperforming, and when a second VM that has an operator in a fourth portion of the flow graph that communicates with an operator in the first portion of the streaming application in the selected VM is also overperforming, the streams manager coalesces the first portion and the fourth portion to run on a single VM.

3. The apparatus of claim 1 wherein the streams manager initially deploys the flow graph on a single VM.

4. The apparatus of claim 1 wherein the streams manager deploys the flow graph to the plurality of VMs by requesting a cloud manager provision the plurality of VMs, and after the cloud manager provisions the plurality of VMs, the streams manager deploys the flow graph to the plurality of VMs.

5. The apparatus of claim 1 wherein the plurality of performance thresholds includes at least one threshold that indicates when at least one operator in the flow graph is underperforming.

6. The apparatus of claim 1 wherein the plurality of performance thresholds includes at least one threshold that indicates when at least one operator in the flow graph is overperforming.

7. The apparatus of claim 1 wherein:
a first of the plurality of performance thresholds comprises a minimum tuple rate for one of the plurality of operators, wherein the one operator is underperforming when the rate of processing tuples by the one operator is less than the minimum tuple rate; and
a second of the plurality of performance thresholds comprises a maximum tuple rate for the one operator, wherein the one operator is overperforming when the rate of processing tuples by the one operator is greater than the maximum tuple rate.

8. The apparatus of claim 1 wherein:
a first of the plurality of performance thresholds comprises a minimum tuple rate for a first group of the plurality of operators that comprises less than all of the plurality of operators, wherein the first group is underperforming when the rate of processing tuples by the first group is less than the minimum tuple rate; and
a second of the plurality of performance thresholds comprises a maximum tuple rate for the first group, wherein the first group is overperforming when the rate of processing tuples by the first group is greater than the maximum tuple rate.

9. An apparatus comprising:
at least one processor;
a memory coupled to the at least one processor;
a streaming application residing in the memory and executed by the at least one processor, the streaming application comprising a flow graph that includes a plurality of operators that process a plurality of data tuples;
a plurality of performance thresholds residing in the memory for the plurality of operators in the flow graph, the plurality of performance thresholds comprising:
a first performance threshold that specifies a minimum tuple rate by a first group of the plurality of operators that comprises less than all of the plurality of operators, wherein when the rate of processing tuples by the first group is less than the first performance threshold, the first group is underperforming;
a second performance threshold that specifies a maximum tuple rate for the first group, wherein when the rate of processing tuples by the first group is greater than the second performance threshold, the first group is overperforming;
a streams manager residing in the memory and executed by the at least one processor, the streams manager deploying the flow graph on at least one virtual machine (VM), wherein the first group of operators is deployed to a selected VM, wherein the streams manager monitors performance of the first group of operators in the selected VM, and when the first group of operators is underperforming, the streams manager splits the first group of operators in the selected VM into second and third portions of the streaming application that are deployed to a plurality of VMs, and when the first group of operators is overperforming, and when a second VM that has an operator in a fourth portion of the flow graph that communicates with an operator in the first group of operators is also overperforming, the streams manager coalesces the first group and the fourth portion to run on a single VM, wherein the streams manager continuously monitors performance of all portions of the flow graph and dynamically changes allocation of portions of the flow graph that are underperforming by splitting at least one portion of the flow graph to different VMs and changes allocation of portions of the flow graph that are overperforming by coalescing at least one portion of the flow graph to a single VM.

10. An apparatus comprising:
at least one processor;
a memory coupled to the at least one processor;
a streaming application residing in the memory and executed by the at least one processor, the streaming application comprising a flow graph that includes a plurality of operators that process a plurality of data tuples;
a first performance threshold that specifies a minimum tuple rate by a first group of the plurality of operators, wherein when the rate of processing tuples by the first group is less than the first performance threshold, the first group is underperforming;
a second performance threshold that specifies a maximum tuple rate for the first group, wherein when the rate of processing tuples by the first group is greater than the second performance threshold, the first group is overperforming;
a streams manager residing in the memory and executed by the at least one processor, the streams manager deploying the flow graph on a single virtual machine (VM) by requesting a cloud manager provision the single VM, and after the cloud manager provisions the single VM, the streams manager deploys the streaming application to the single VM, the streams manager monitoring performance of the first group, and when the first group is underperforming, the streams manager splits the first group into first and second portions of the streaming application that are deployed to first and second VMs by requesting the cloud manager provision the first and second VMs, and when the streams manager determines the first portion of the streaming application in the first VM is underperforming, the streams manager splits the first portion of the streaming application in the first VM into third and fourth portions of the streaming application that are deployed to respective third and fourth VMs by requesting the cloud manager provision the third and fourth VMs, and when the second portion of the streaming application in the second VM is underperforming, the streams manager splits the second portion of the streaming application in the second VM into fifth and sixth portions of the streaming application that are deployed to respective fifth and sixth VMs, and when the first portion of the streaming application in the first VM is overperforming, and when a different VM that has an operator in a seventh portion of the flow graph that communicates with an operator in the first portion of the streaming application in the selected VM is also overperforming, the streams manager coalesces the first portion and the seventh portion to run on a single VM, wherein the streams manager continuously monitors performance of all portions of the flow graph and dynamically changes allocation of portions of the flow graph that are underperforming by splitting at least one portion of the flow graph to different VMs and changes allocation of portions of the flow graph that are overperforming by coalescing at least one portion of the flow graph to a single VM.

* * * * *